US010315335B2

(12) United States Patent
Hu et al.

(10) Patent No.: US 10,315,335 B2
(45) Date of Patent: Jun. 11, 2019

(54) RAPID CURING OF THIN COMPOSITE MATERIAL SECTIONS

(71) Applicant: Solidia Technologies, Inc., Piscataway, NJ (US)

(72) Inventors: Xudong Hu, Plainsboro, NJ (US); Deepak Ravikumar, Piscataway, NJ (US); Devin Patten, Red Bank, NJ (US)

(73) Assignee: Solidia Technologies, Inc., Piscataway, NJ (US)

( * ) Notice: Subject to any disclaimer, the term of this patent is extended or adjusted under 35 U.S.C. 154(b) by 556 days.

(21) Appl. No.: 14/295,402

(22) Filed: Jun. 4, 2014

(65) Prior Publication Data
US 2014/0361471 A1 Dec. 11, 2014

Related U.S. Application Data

(60) Provisional application No. 61/832,233, filed on Jun. 7, 2013.

(51) Int. Cl.
B28B 11/24 (2006.01)
C04B 40/02 (2006.01)
C04B 20/12 (2006.01)
C04B 28/10 (2006.01)
B01J 3/04 (2006.01)

(52) U.S. Cl.
CPC ............... *B28B 11/24* (2013.01); *B01J 3/04* (2013.01); *C04B 20/12* (2013.01); *C04B 28/10* (2013.01); *C04B 40/0231* (2013.01); *Y02P 40/18* (2015.11)

(58) Field of Classification Search
CPC .................... C04B 40/0231; B28B 11/24
See application file for complete search history.

(56) References Cited

U.S. PATENT DOCUMENTS 4,362,679 A * 12/1982 Malinowski .............. B28B 7/44
106/601
5,637,412 A * 6/1997 Jennings .................. B28B 1/00
106/606
2006/0235258 A1* 10/2006 Wagh ..................... B09B 3/0041
588/249

(Continued)

FOREIGN PATENT DOCUMENTS

JP  2004026629 A * 1/2004

OTHER PUBLICATIONS

JP 2004-026629 A (Miyazaki) Jan. 2004 (English language machine translation). [online] [retrieved Oct. 17, 2017]. Retrieved from: Espacenet. (Year: 2004).*

*Primary Examiner* — Erin Snelting
(74) *Attorney, Agent, or Firm* — Dentons US LLP

(57) ABSTRACT

A method of preparing and rapidly curing a composite material having a thin cross section. The composite material includes a mixture of solid particles, at least some of which are a material that reacts with $CO_2$, such as a silicate, for example Wollastonite. The green material is prepared by mixing the solid components with a liquid such as water to form a slurry, and forming green bodies by placing the slurry in forms. The green bodies are reacted with $CO_2$ to form cured composite materials having thin sections, in the range of 10 to 15 mm. Curing in periods of 6 hours has been demonstrated.

16 Claims, 16 Drawing Sheets

(56) References Cited

U.S. PATENT DOCUMENTS

| | | | |
|---|---|---|---|
| 2008/0045633 A1* | 2/2008 | Mita | C04B 24/267 524/5 |
| 2010/0201022 A1* | 8/2010 | Yukihira | B28B 3/02 264/113 |
| 2013/0122267 A1* | 5/2013 | Riman | C04B 14/043 428/201 |
| 2014/0127450 A1* | 5/2014 | Riman | C04B 28/10 428/105 |
| 2014/0263683 A1* | 9/2014 | Krishnan | C04B 20/12 238/91 |
| 2014/0272216 A1* | 9/2014 | Deo | C04B 18/146 428/34.5 |
| 2014/0314990 A1* | 10/2014 | Henn | C04B 35/22 428/141 |
| 2014/0342124 A1* | 11/2014 | Zambrzycki | B29C 39/003 428/148 |
| 2015/0266778 A1* | 9/2015 | Riman | B28B 11/245 106/286.6 |

\* cited by examiner

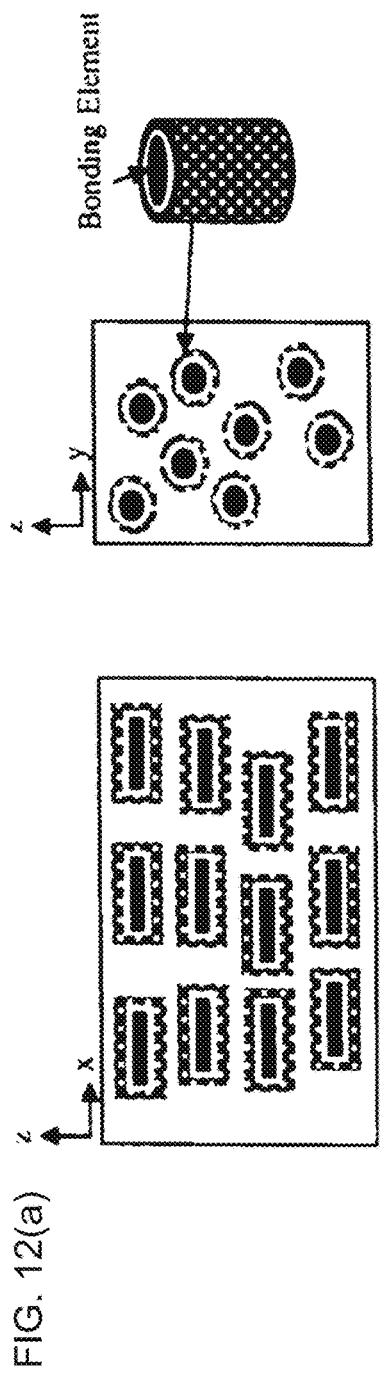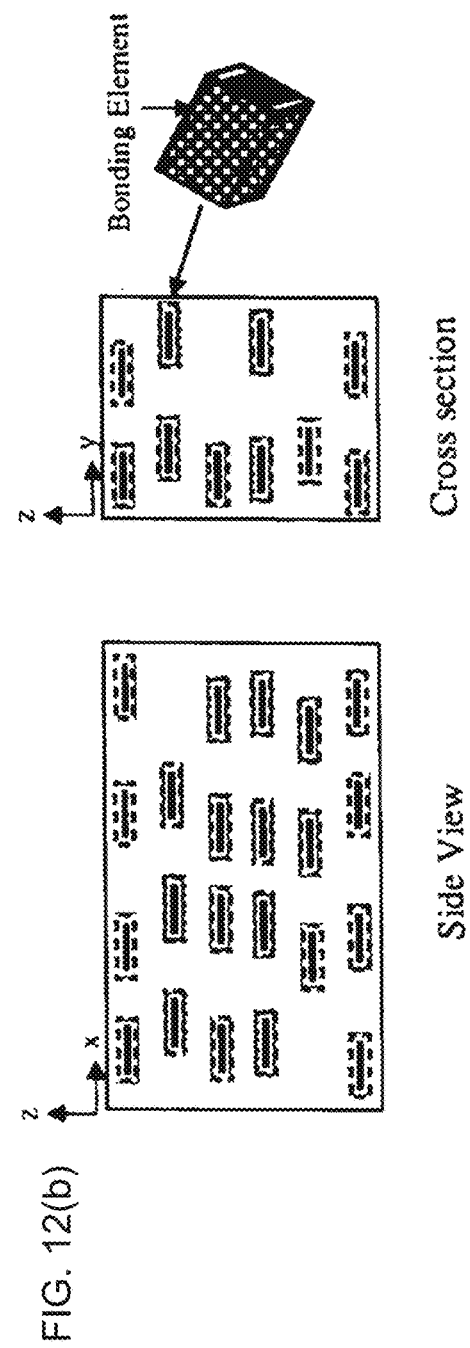
FIG. 12(a)
FIG. 12(b)

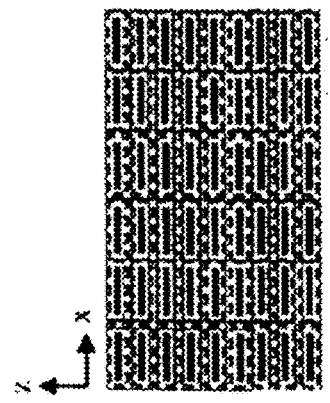
FIG. 12(e)
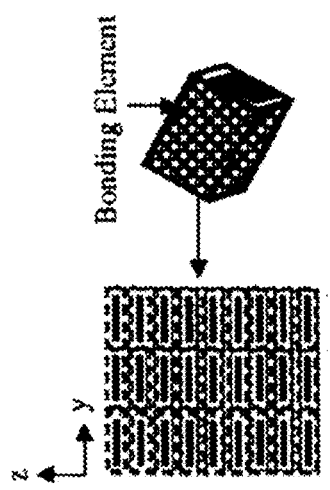
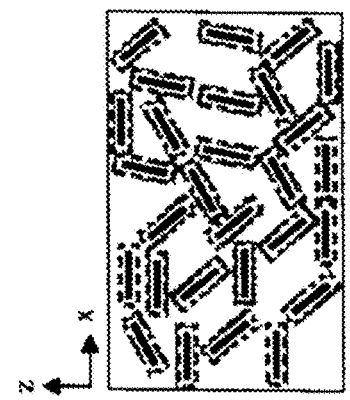
FIG. 12(f)
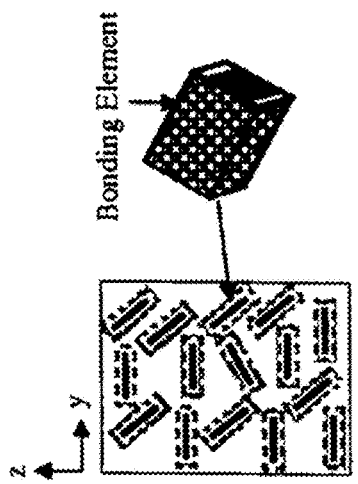

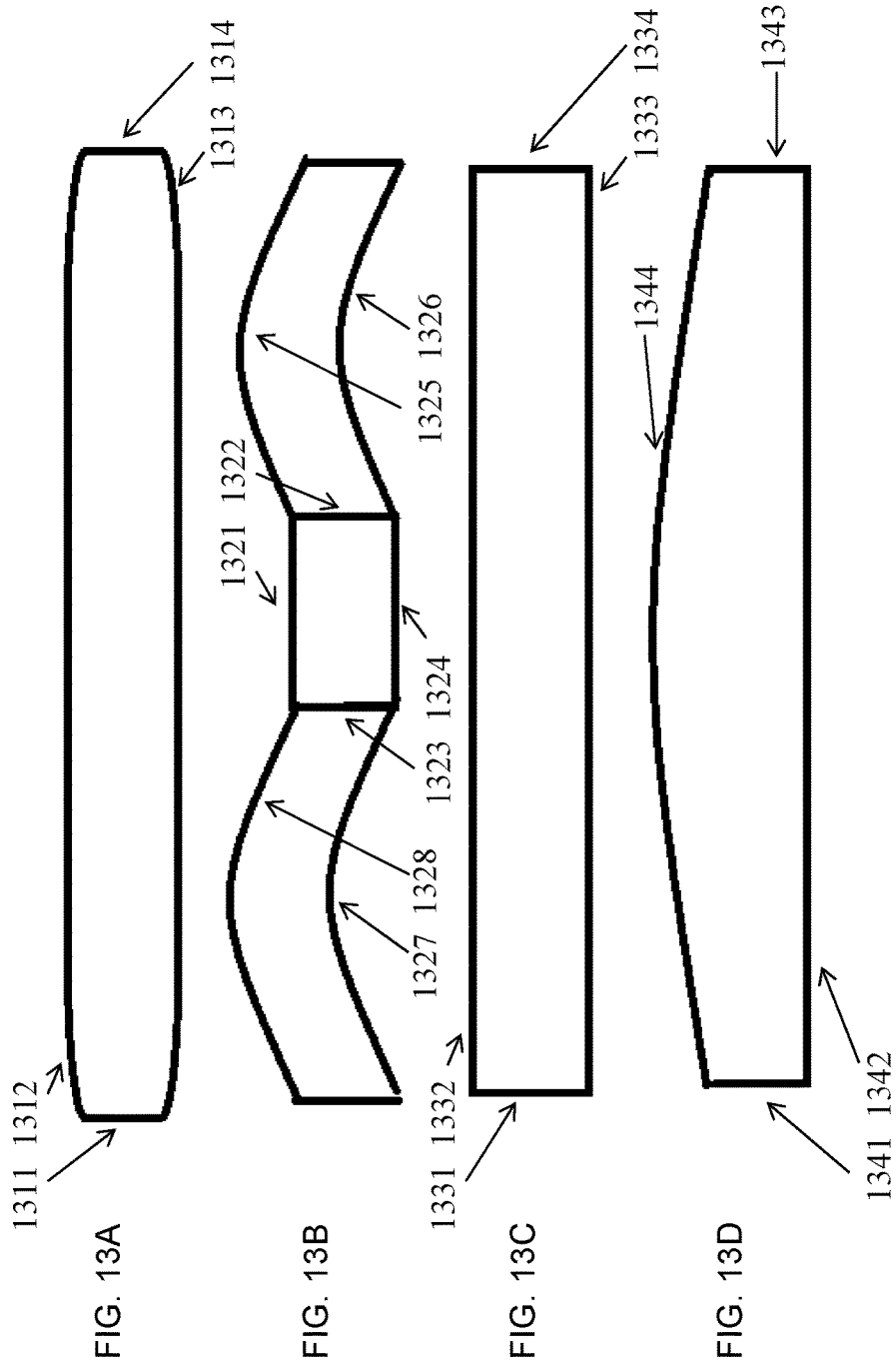

US 10,315,335 B2

RAPID CURING OF THIN COMPOSITE MATERIAL SECTIONS

CROSS-REFERENCE TO RELATED APPLICATIONS

This application claims priority to and the benefit of co-pending U.S. provisional patent application Ser. No. 61/832,233, filed Jun. 7, 2013, which application is incorporated herein by reference in its entirety.

NAMES OF THE PARTIES TO A JOINT RESEARCH AGREEMENT

This invention resulted from work under a joint research agreement between Assignee Solidia Technologies, Inc. and Rutgers, The State University of New Jersey.

FIELD OF THE INVENTION

The invention relates to composite material products in general and particularly to systems and methods that provide products that have thin composite material sections.

BACKGROUND OF THE INVENTION

Thin concrete sections are used in a wide range of application such as roofing tiles, floor tiles, decorative wall panels, exterior siding, and the like. These concrete sections are conventionally made with Portland cement that relies on only hydration for strength gain and other performance. Such hydration reactions have the down side of being very slow at ambient conditions.

There is a need for systems and methods that provide objects made from composite materials that have thin sections that can be cured rapidly.

SUMMARY OF THE INVENTION

According to one aspect, the invention features a method of rapidly curing a thin composite material section. The method of rapidly curing a thin composite material section comprises the steps of: preparing a green specimen of a composite material having a cross section in the range of 5 mm to 25 mm; and reacting the green specimen with $CO_2$ in a curing chamber to produce a cured composite material having a thin section.

In one embodiment, the cross section is in the range of 11 mm to 14 mm.

In another embodiment, the green specimen comprises a silicate material that reacts with $CO_2$.

In yet another embodiment, the silicate material is synthetic wollastonite.

In still another embodiment, the step of preparing a green specimen of a composite material comprises the step of mixing a granular silicate material with a second granular solid material in a predetermined proportion.

In a further embodiment, the second granular solid material is at least one of sand and flyash.

In yet a further embodiment, the step of preparing a green specimen of a composite material comprises the further step of mixing the granular silicate material and the second granular solid material with a liquid to form a slurry.

In still a further embodiment, the step of preparing a green specimen of a composite material comprises the further step of mixing the granular silicate material and the second granular solid material with continuous or discontinuous fibers.

In an additional embodiment, the liquid comprises water and a water-reducing component.

In one more embodiment, the method further comprises the step of heating the cured composite material having a thin section to drive off water.

In still a further embodiment, the step of reacting the green specimen with $CO_2$ in a curing chamber is performed for 6 hours or less.

In one embodiment, the step of reacting the green specimen with $CO_2$ in a curing chamber is performed at a temperature of 60° C.

In another embodiment, the thin composite material is shaped in a mold prior to the reacting step.

In yet another embodiment, the thin composite material is shaped in a mold by applying vibration.

In still another embodiment, the thin composite material is shaped in a mold by pressing or extrusion.

In a further embodiment, the thin composite material has a length in the range of 55 to 220 mm.

In yet a further embodiment, the thin composite material has a width in the range of 55 to 220 mm.

In an additional embodiment, the thin composite material has a cross sectional shape as shown in any one of FIG. 13A, FIG. 13B, FIG. 13C and FIG. 13D.

In another embodiment, the thin composite material comprises bonding elements having a mean particle size in the range of 5 to 50 micrometers.

In yet another embodiment, the thin composite material comprises bonding elements having a mean particle size in the range of 5 to 50 micrometers.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 12(a)-12(f) are schematic illustrations of side view and cross section views of composite materials according to exemplary embodiments of the present invention, illustrating (a) 1D oriented fiber-shaped bonding elements in a dilute bonding matrix (bonding elements are not touching), (b) 2D oriented platelet shaped bonding elements in a dilute bonding matrix (bonding elements are not touching), (c) 3D oriented platelet shaped bonding elements in a dilute bonding matrix (bonding elements are not touching), and (d) randomly oriented platelet shaped bonding elements in a dilute bonding matrix (bonding elements are not touching), wherein the composite materials includes the bonding matrix and filler components such as polymers, metals, inorganic particles, aggregates etc., (e) a concentrated bonding matrix (with a volume fraction sufficient to establish a percolation network) of bonding elements where the matrix is 3D oriented, and (f) a concentrated bonding matrix (with a volume fraction sufficient to establish a percolation network) of randomly oriented bonding elements, wherein filler components such as polymers, metals, inorganic particles, aggregates etc. may be included.

FIG. 13A is a schematic cross section of a first shape of a thin composite material section.

FIG. 13B is a schematic cross section of a second shape of a thin composite material section.

FIG. 13C is a schematic cross section of a third shape of a thin composite material section.

FIG. 13D is a schematic cross section of a fourth shape of a thin composite material section.

DETAILED DESCRIPTION

Chemical Discussion

Figure 1:
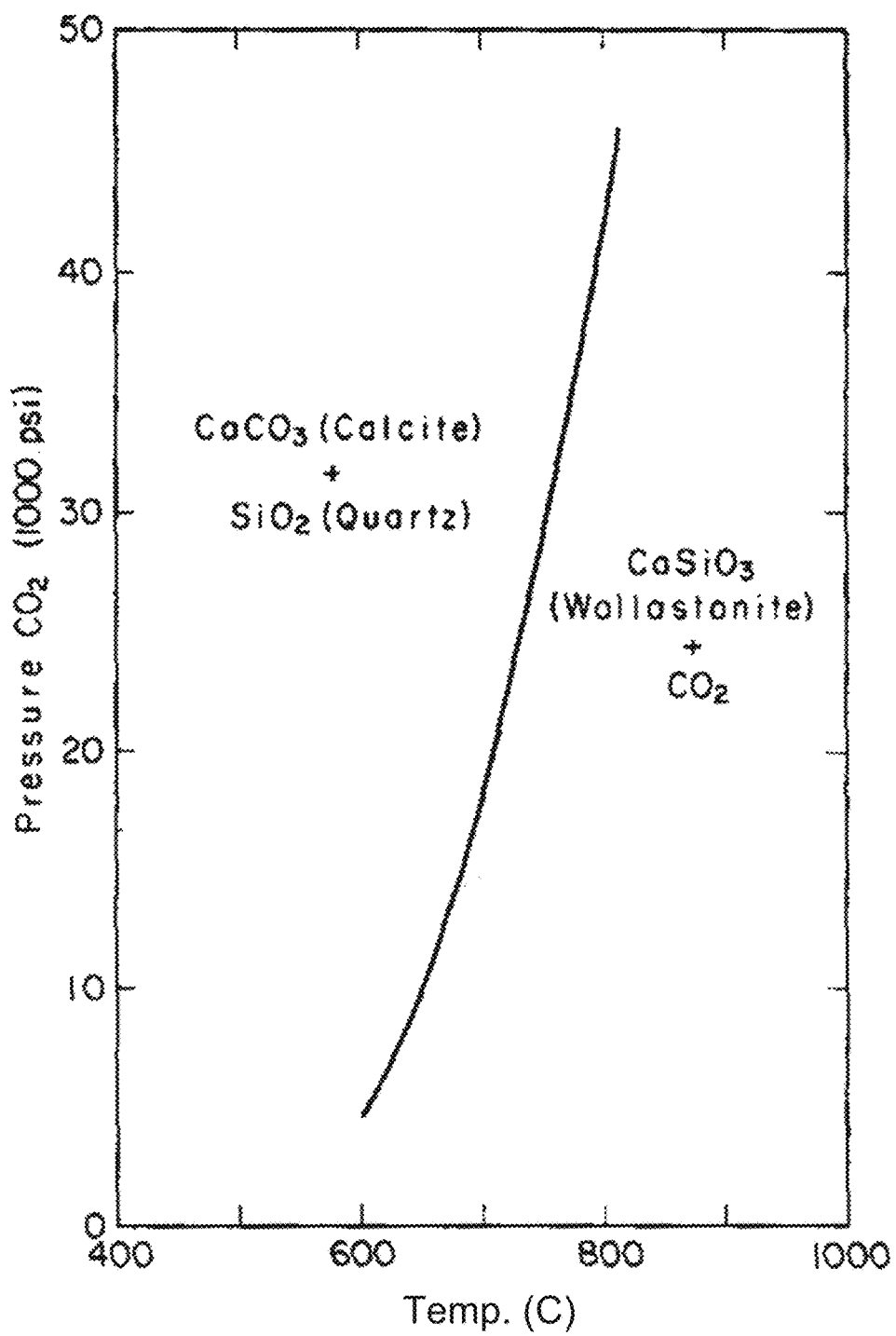
FIG. 1 is a pressure-temperature phase diagram showing the phases present in the reversible reaction $CaCO_3+SiO_2 \leftrightarrow CaSiO_3$ (Wollastonite)$+CO_2$.
Figure 2:
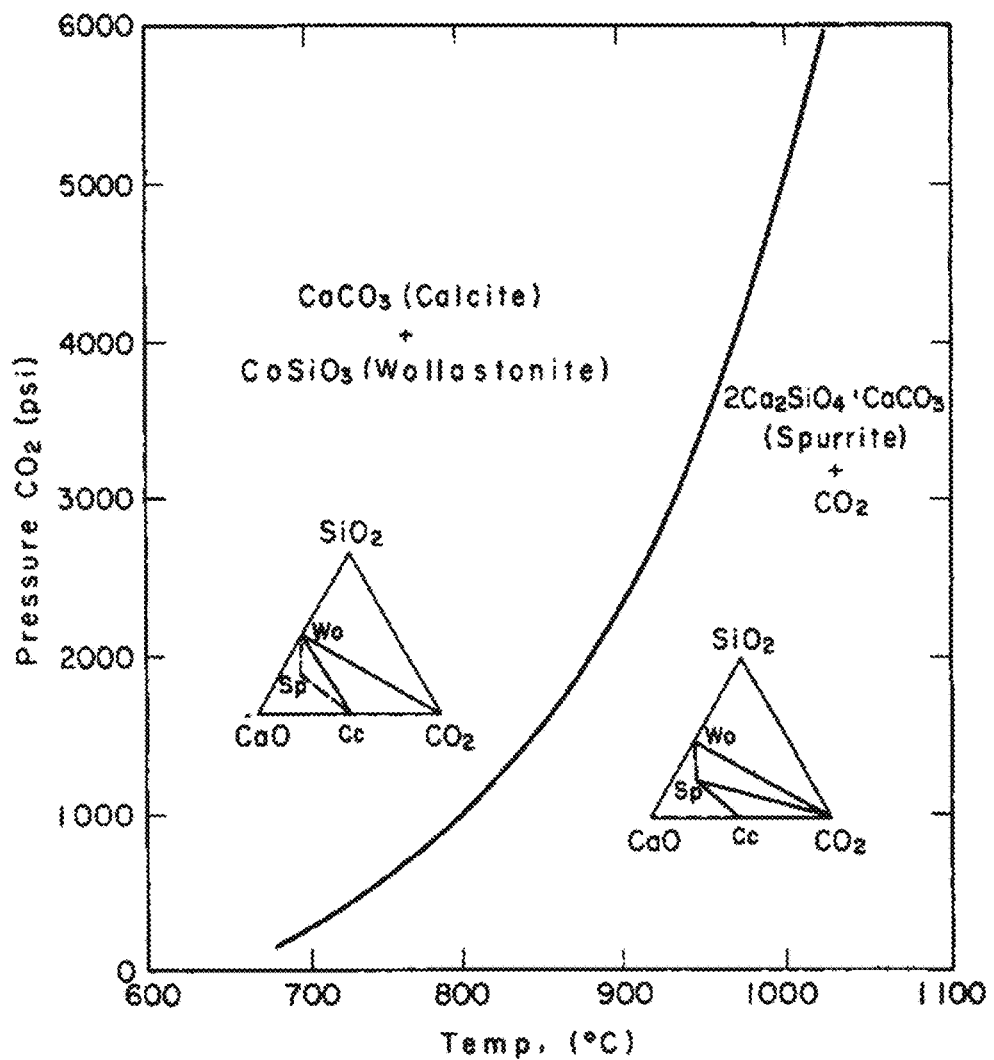
FIG. 2 is a pressure-temperature phase diagram showing the phases present in the reversible reaction $3CaCO_3+2CaSiO_3 \leftrightarrow 2Ca_2SiO_4 \cdot CaCO_3+CO_2$.
Figure 3:
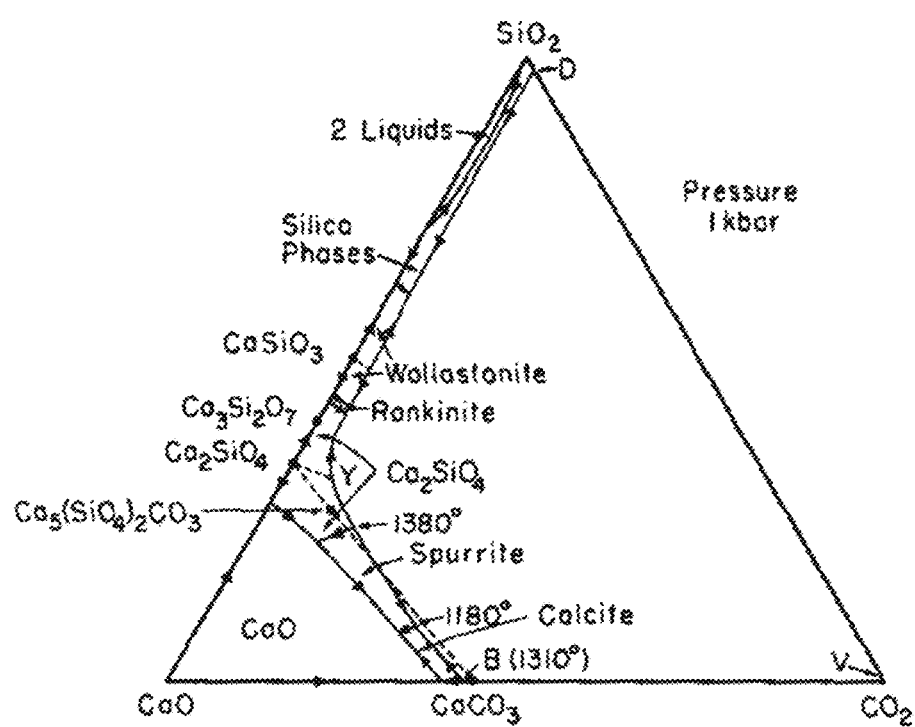
FIG. 3 is a phase diagram of the $CaO-SiO_2-CO_2$ system at a pressure of 1 kilobar.
Figure 4:
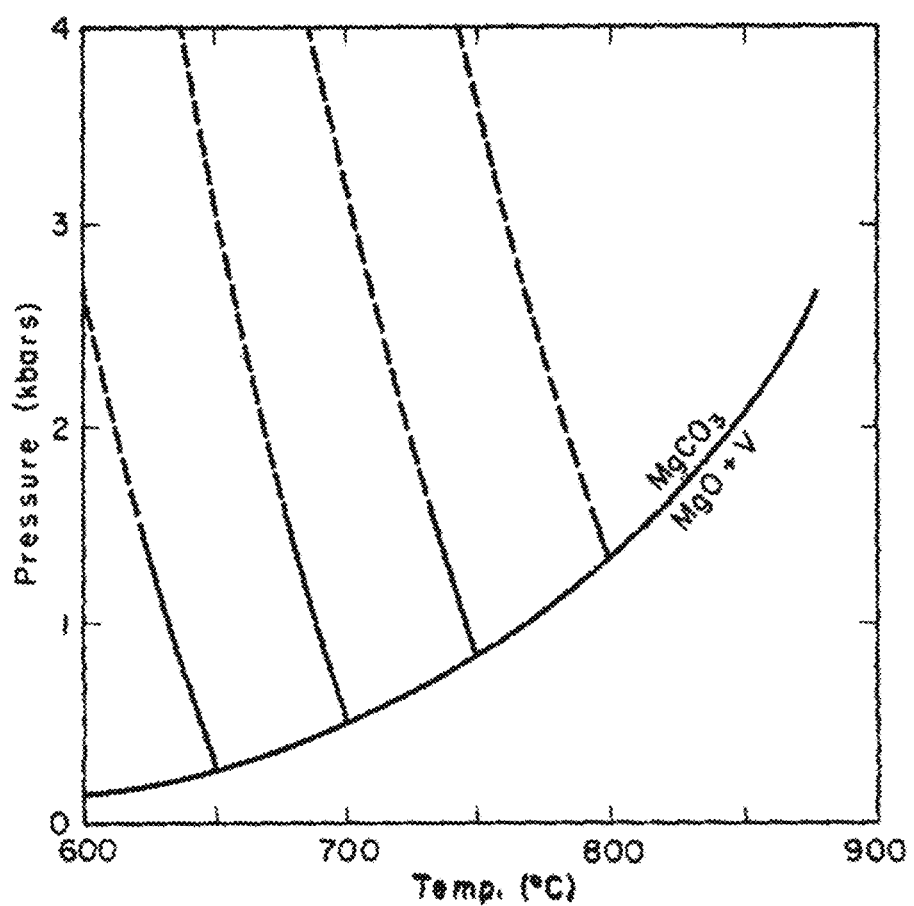
FIG. 4 is a pressure-temperature phase diagram showing the phases present in the reversible reaction $MgO+CO_2 \leftrightarrow MgCO_3$.
Figure 5:
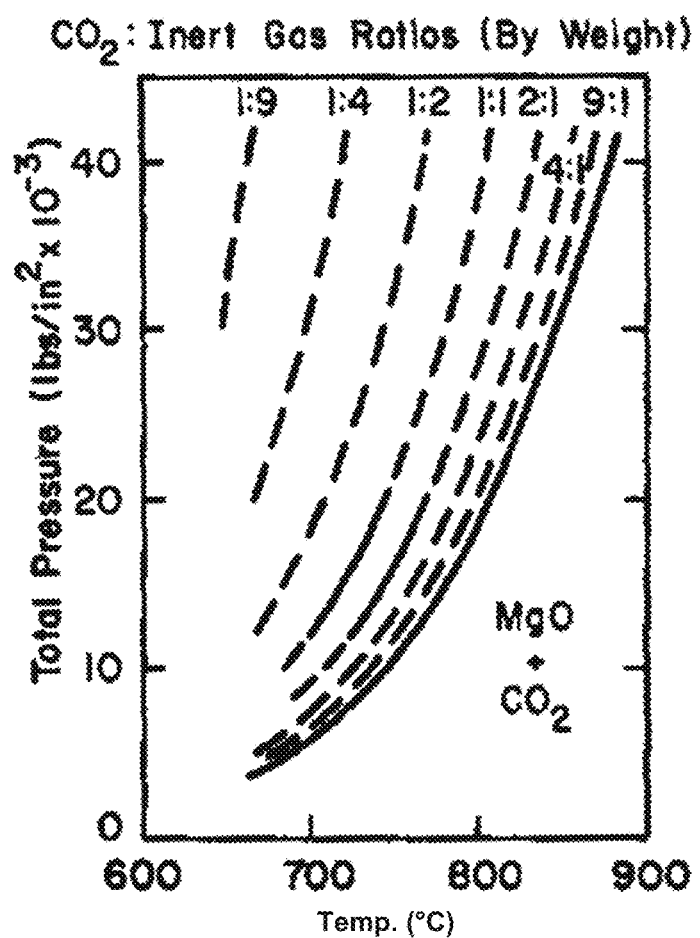
FIG. 5 is a pressure-temperature phase diagram showing the equilibrium curves for the reversible reaction $MgO+CO_2 \leftrightarrow MgCO_3$ as a function of the proportion of $CO_2$ in an inert gas.
Figure 6:
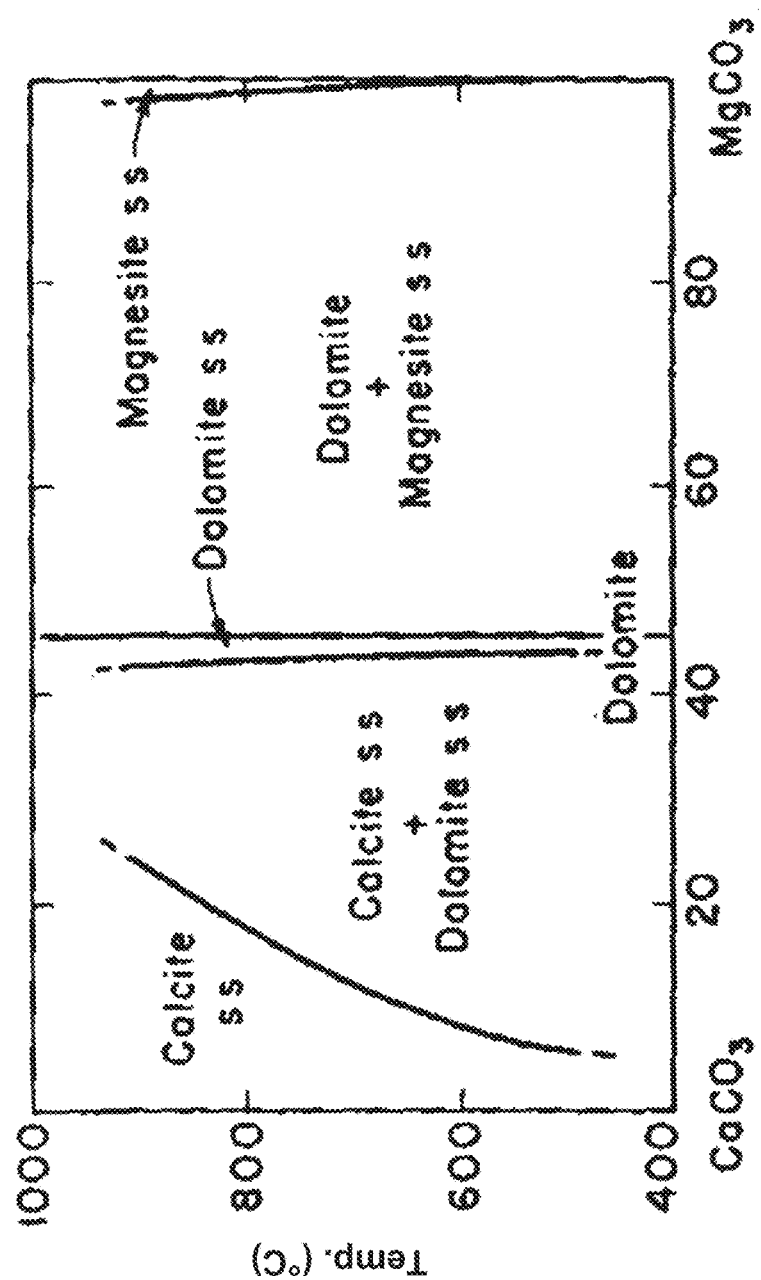
FIG. 6 is a temperature-composition phase diagram that illustrates the stability regions for various phases in the $CaCO_3-MgCO_3$ system.
Figure 7:
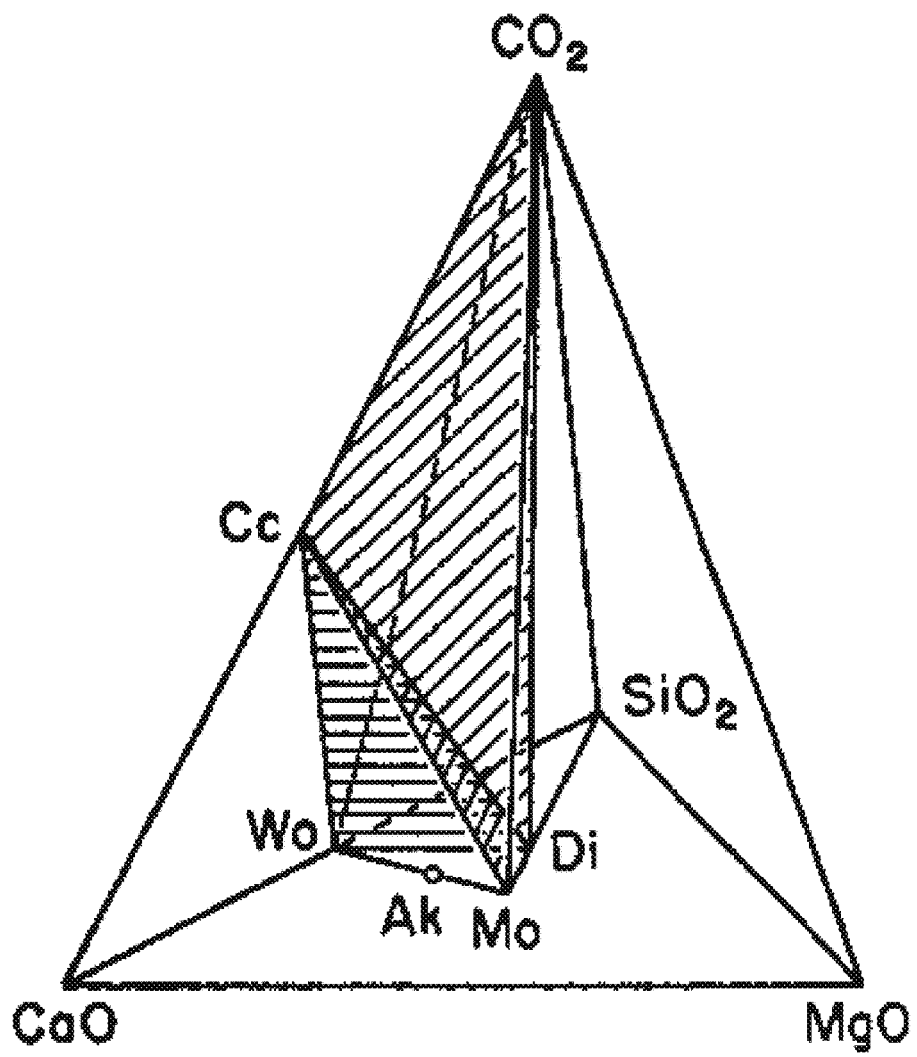
FIG. 7 is a tetrahedron diagram illustrating the phase relationships among the compounds CaO, MgO, $SiO_2$ and $CO_2$, and showing the $CO_2$ deficient region below the Cc-Di-Wo and the CC-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
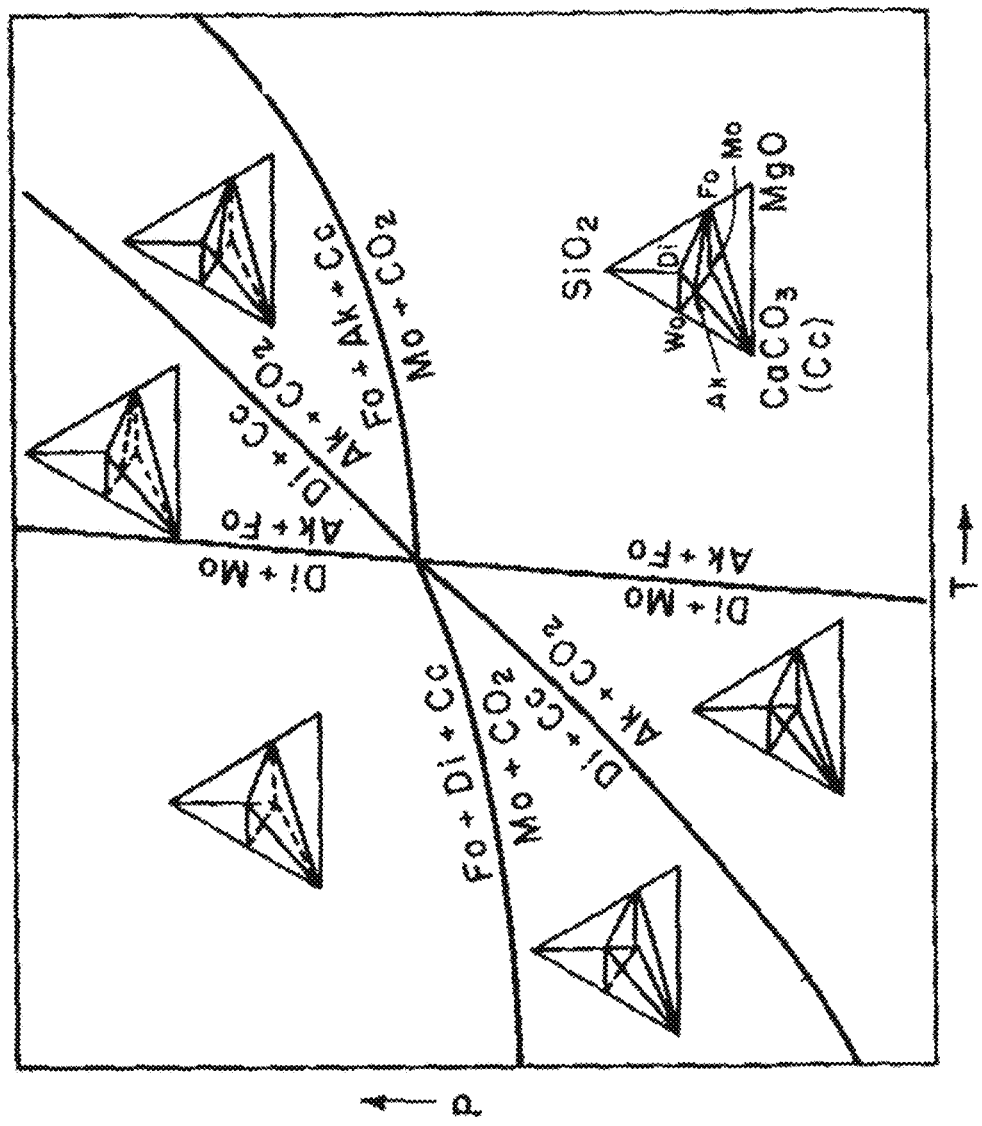
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound system $CaCO_3$, MgO, $SiO_2$.

This invention provides apparatus and methods used to manufacture novel composite materials that are cured predominantly by a $CO_2$ consumption reaction. The materials exhibit useful properties and can be readily produced from widely available, low cost precursor materials by a process suitable for large-scale production with minimal environmental impact. The precursor materials include inexpensive and abundant calcium silicate rich materials, fine particles and coarse particles. The calcium silicate rich materials may be comprised of ground Wollastonite. The fine and coarse particles may be comprised of ground limestone or other calcium carbonate based materials, ground quartz or other $SiO_2$ based materials, sand, flyash and crushed rock. The fine and coarse particles may also be comprised of crushed minerals such as granite, mica and feldspar. Other process components include water and $CO_2$. Various additives can be used to modify and fine-tune the physical appearance and/or mechanical properties of the resulting composite material, such as additives selected from one or more of pigments (e.g., black iron oxide, cobalt oxide and chromium oxide), colored glass and/or colored quartz. Additives regarding water usage reduction and changes in rheology can also be used.

The composite materials can be produced, as disclosed herein, using the energy-efficient Hydrothermal Liquid Phase Sintering (HLPS) process to create bonding elements which hold together the various components of the composite material. The composite materials can be manufactured at low cost and with favorable environmental impact. For example in preferred embodiments of the invention, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 20090142578 (application Ser. No. 12/271,513), WO 2009/102360 (PCT/US2008/083606), WO 2011/053598 (PCT/US2010/054146), WO 2011/090967 (PCT/US2011/021623), U.S. application Ser. No. 13/411,218 filed Mar. 2, 2012 (Riman et al.), U.S. application Ser. No. 13/491,098 filed Jun. 7, 2012 (Riman et al), U.S. Provisional Patent Application No. 61/708,423 filed Oct. 1, 2012, and U.S. Provisional Patent Application Nos. 61/709,435, 61/709,453, 61/709,461, and 61/709,476, all filed Oct. 4, 2012, each of which is expressly incorporated herein by reference in its entirety for all purposes.

As used herein, the term "calcium silicate" refers to naturally-occurring minerals or synthetic materials that are comprised of one or more of a group of calcium-silicon-containing compounds including $CaSiO_3$ (also known as "Wollastonite" or "pseudo-wollastonite" and sometimes formulated as $CaO·SiO_2$), $Ca_3Si_2O_7$ (also known as "Rankinite" and sometimes formulated as $3CaO·2SiO_2$), $Ca_2SiO_4$ (also known as "Belite" and sometimes formulated as $2CaO·SiO_2$), $Ca_3SiO_5$ (also known as "Alite" and sometimes formulated as $3CaO·SiO_2$), and $Ca_5(SiO_4)_2CO_3$ (also known as "Spurrite" and sometimes formulated as $2Ca_2SiO_4·CaCO_3$), each of which materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. FIG. 1 through FIG. 8 are phase diagrams that show various phase interrelationships among some of the materials described.

It should be understood that, compositions and methods disclosed herein can be adopted to use magnesium silicate in place of or in addition to calcium silicate. As used herein, the term "magnesium silicate" refers to nationally-occurring minerals or synthetic materials that are comprised of one or more of a groups of magnesium-silicon-containing compounds including, for example, $Mg_2SiO_4$ (also known as "Fosterite"), $Mg_3Si_4O_{10}(OH)_2$) (also known as "Talc"), and $CaMgSiO_4$ (also known as "Monticellite"), each of which materials may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

In certain preferred embodiments, the plurality of bonding elements are prepared by chemical transformation from ground Wollastonite (or a non-Wollastonite precursor calcium silicate or magnesium silicate) by reacting it with $CO_2$ via a gas-assisted HLPS process.

In certain preferred embodiments, preparing a green specimen of a composite material comprises the further step of mixing a granular silicate material and a second granular solid material with continuous or discontinuous fibers.

In certain embodiments, the composite material is characterized by a compressive strength from about 20 MPa to about 150 MPa (e.g., about 20 MPa to about 140 MPa, about 20 MPa to about 130 MPa, about 20 MPa to about 120 MPa, about 20 MPa to about 110 MPa, about 20 MPa to about 100 MPa, about 20 MPa to about 90 MPa, about 20 MPa to about 80 MPa, about 20 MPa to about 70 MPa, about 20 MPa to about 60 MPa, about 20 MPa to about 50 MPa, about 20 MPa to about 40 MPa, about 30 MPa to about 150 MPa, about 40 MPa to about 150 MPa, about 50 MPa to about 150 MPa, about 60 MPa to about 150 MPa, about 70 MPa to about 150 MPa, about 80 MPa to about 150 MPa, about 90 MPa to about 150 MPa, about 100 MPa to about 150 MPa, about 110 MPa to about 150 MPa, about 120 MPa to about 150 MPa, about 130 MPa to about 150 MPa).

In certain embodiments, the composite material is characterized by a flexural strength from about 2 MPa to about 15 MPa (e.g., about 2 MPa to about 14 MPa, about 2 MPa to about 13 MPa, about 2 MPa to about 12 MPa, about 2 MPa to about 11 MPa, about 2 MPa to about 10 MPa, about 2 MPa to about 9 MPa, about 2 MPa to about 8 MPa, about 2 MPa to about 7 MPa, about 2 MPa to about 6 MPa, about 2 MPa to about 5 MPa, about 2 MPa to about 4 MPa, about 3 MPa to about 15 MPa, about 4 MPa to about 15 MPa, about 5 MPa to about 15 MPa, about 6 MPa to about 15 MPa, about 7 MPa to about 15 MPa, about 8 MPa to about 15 MPa, about 9 MPa to about 15 MPa, about 10 MPa to about 15 MPa, about 11 MPa to about 15 MPa, about 12 MPa to about 15 MPa, about 13 MPa to about 15 MPa).

In certain embodiments, the composite material is characterized by water absorption of less than about 10% (e.g., less than about 8%, 5%, 4%, 3%, 2%, or 1%).

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

Equipment and Processing Discussion $CO_2$ Control

In the embodiments described, industrial grade $CO_2$ at about 99% purity is used, which is provided by a variety of different industrial gas companies, such as Praxair, Inc., Linde AG, Air Liquide, and others. This supply can be held in large pressurized holding tanks in the form of liquid carbon dioxide regulated at a temperature such that it maintains a vapor pressure of approximately 300 PSIG. This gas is then piped to a $CO_2$ curing enclosure or chamber. In the simplest system, $CO_2$ is flowed through the enclosure at a rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so s to maintain a concentration of $CO_2$ sufficient to drive the curing reaction.

As an example, we now describe a method for sustaining carbon dioxide concentrations during the reaction that is well suited for keeping a highly consistent concentration, although it is a "closed loop" process which tends to be the most expensive technique. This method uses the measurement of $CO_2$ concentration in the system directly, and employs a controller such as a PLC to control the $CO_2$ concentration at a set point with an electronic/automated control valve. A measurement technique to measure $CO_2$ directly such as NDIR should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, using a dry bulb-wet bulb humidity measurement device or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of composite material specimens.

Humidity Control

Figure 9:
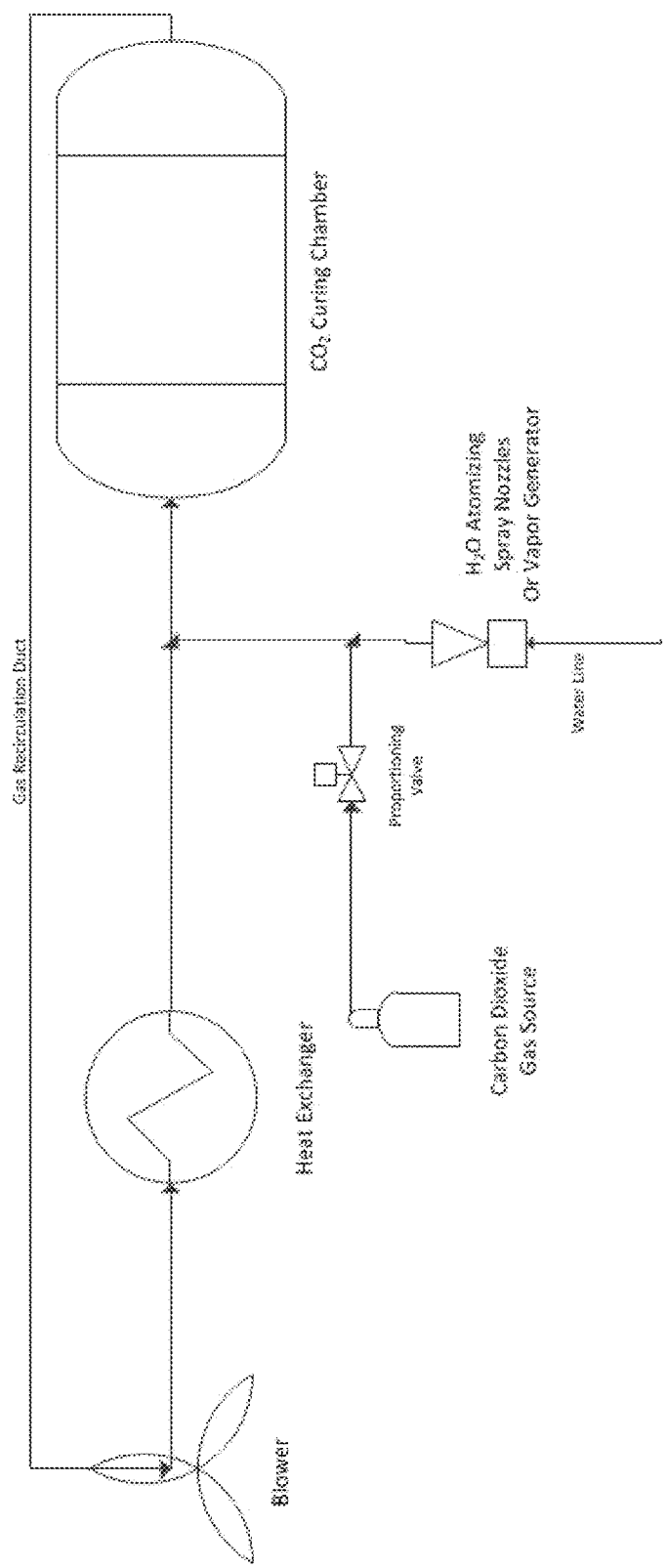
FIG. 9 is a schematic diagram of a $CO_2$ composite material curing chamber that provides humidification according to principles of the invention.

FIG. 9 is a schematic diagram of a $CO_2$ composite material curing chamber that provides humidification according to principles of the invention. In FIG. 9, a water supply is provided and water vapor is added to the atmosphere that is circulating within the curing chamber. The water can be any convenient source of potable water. In some embodiments, ordinary tap water is used. In some embodiments, the water can be converted to vapor by flowing through a misting nozzle or an atomizing spray nozzle, an electric vapor generator, a gas fired vapor generator, or by being heated above the gas temperature in the chamber so as to cause evaporation from a liquid water supply an example being a drum reactor with an immersion heater. In yet another embodiment, the $CO_2$ supply can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in $CO_2$ composite material curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the $CO_2$ composite material curing systems described herein.

Depending on the type and geometry of the product being cured, the design of the chamber, and the packing efficiency of product in the chamber the humidity may need to be either decreased or increased and regulated to a specified set point. Set points may range anywhere from 1% to 99% relative humidity. Three different methods for humidity control may exist in $CO_2$ composite material curing processes that could be combined into a single system. One method for humidification in one embodiment of a $CO_2$ curing system is represented in FIG. 9. Another method allows one to remove moisture from the system to cure the composite material products with $CO_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 10:
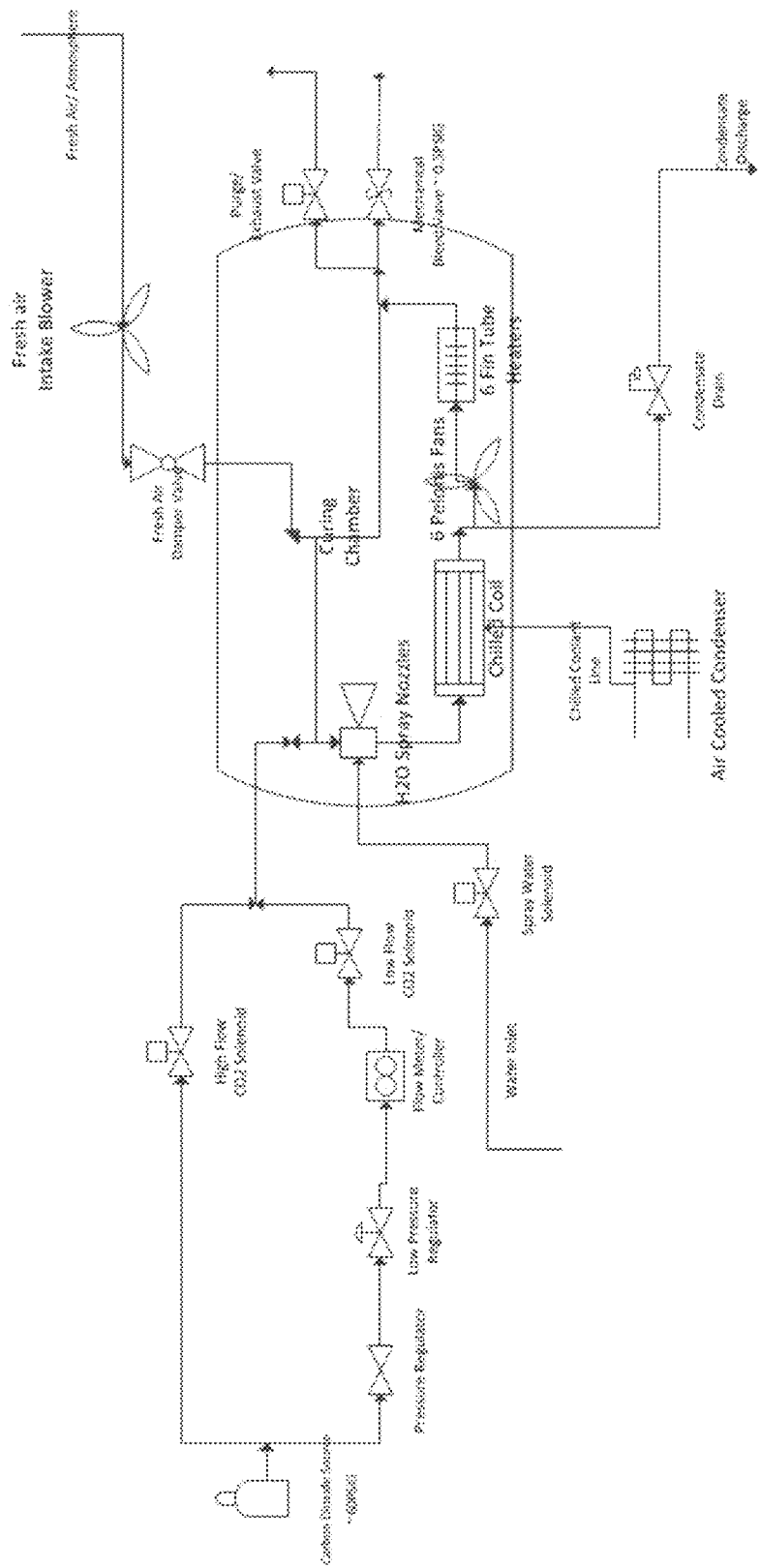
FIG. 10 is a schematic diagram of a curing chamber with multiple methods of humidity control as well as ability to control and replenish $CO_2$ using constant flow or pressure regulation and that can control the temperature according to principles of the invention.

FIG. 10 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Temperature Control

In some embodiments, temperature is measured utilizing a sensor such as a thermocouple or an RTD. The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

Gas Flow Control

Another control parameter is gas velocity across the material that is to be cured in the system. The gas velocity can be very dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

Methods of Preparing a Thin Composite Material Slab

We describe a process for preparing a composite material. The process includes: mixing a particulate composition and a liquid composition to create a slurry mixture; forming the slurry mixture into a desired shape, either by casting the slurry into a mold, pressing the slurry in a mold, pressing the slurry in a vibrating mold, extruding the slurry, slip forming the slurry, or using any other shape-forming method common in concrete production, and curing the formed slurry mixture at a temperature in the range from about 20° C. to about 150° C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material exhibiting a texture and/or a pattern and the desired physical properties related to compressive strength, flexural strength, density, resistance to degradation, and so forth. In certain preferred embodiments, preparing a green specimen of a composite material comprises the step of mixing a granular silicate material and a second granular solid material with continuous or discontinuous fibers The particulate composition includes a ground calcium silicate having a median particle size in the range from about 1 μm to about 100 μm. In addition the particulate composition may include a ground calcium carbonate or a $SiO_2$ bearing material having a median particle size in the range from about 3 μm to about 25 mm. The liquid composition includes water and may include a water-soluble dispersant.

The process can further include, before curing the casted mixture, the step of drying the casted mixture. The particulate composition further comprises a pigment or a colorant as discussed herein.

In certain embodiments, curing the formed slurry mixture is performed at a temperature in the range from about 30° C. to about 120° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 60° C. to about 110° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 80° C. to about 100° C. for about 1 hour to about 60 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature equal to or lower than about 60° C. for about 1 hour to about 50 hours under a vapor comprising water and $CO_2$ and having an ambient atmospheric pressure.

For example, in some embodiments, the ground calcium silicate has a median particle size from about 1 μm to about 100 μm (e.g., about 1 μm, 5 μm, 10 μm, 15 μm, 20 μm, 25 μm, 30 μm, 40 μm, 90 μm).

In certain preferred embodiments, the liquid composition includes water and a water-soluble dispersant comprising a polymer salt (e.g., an acrylic homopolymer salt) having a concentration from about 0.1% to about 2% w/w of the liquid composition.

Composite materials prepared according to a process disclosed herein can exhibit a compressive strength from about 20 MPa to about 150 MPa and a flexural strength from about 2 MPa to about 15 MPa.

We also describe one or more articles of manufacture made from a composite material.

Any suitable precursor materials may be employed. For example calcium silicate particles formed primarily of Wollastonite, $CaSiO_3$, can react with carbon dioxide dissolved in water. It is believed that calcium cations are leached from the Wollastonite and transform the peripheral portion of the Wollastonite core into calcium-deficient Wollastonite. As the calcium cations continue to be leached from the peripheral portion of the core, the structure of the peripheral portion eventually become unstable and breaks down, thereby transforming the calcium-deficient Wollastonite peripheral portion of the core into a predominantly silica-rich first layer. Meanwhile, a predominantly calcium carbonate second layer precipitates from the water.

More specifically, the first layer and second layer may be formed from the precursor particle according the following reaction (1) which can use water as a reaction medium, and not as a reagent (that is, the water is not consumed):

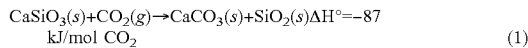

$$CaSiO_3(s)+CO_2(g) \rightarrow CaCO_3(s)+SiO_2(s) \Delta H° = -87 \text{ kJ/mol } CO_2 \quad (1)$$

For example, in a silicate mineral carbonation reaction such as with Wollastonite, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from $CaSiO_3$. The released calcium cations and the dissociated carbonate species lead to the precipitation of insoluble carbonates. Silica-rich layers are thought to remain on the mineral particles as calcium depleted layers.

Thus, according to a preferred embodiment of the invention, $CO_2$ preferentially reacts with the calcium cations of the Wollastonite precursor core, thereby transforming the peripheral portion of the precursor core into a silica-rich first layer and a calcium carbonate-rich second layer. Also, the presence of the first and second layers on the core act as a barrier to further reaction between Wollastonite and carbon dioxide, resulting in the bonding element having the core, first layer and second layer.

In some embodiments, silicate materials having metals other than Ca or in addition to Ca, for example Fosterite ($Mg_2SiO_4$), Diopside ($CaMgSi_2O_6$), and Talc ($Mg_3Si_4O_{10}(OH)_2$) can react with carbon dioxide dissolved in water in a manner similar to the reaction of Wollastonite, as described above. It is believed that such silicate materials can be used, alone, in combination, and/or in combination with Wollastonite, as precursors for bonding elements according to principles of the invention.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor: D. R. Lide, Chapters 6 and 8, 87$^{th}$ Edition 2006-2007, CRC.) This partially infiltrated state enables the reaction to proceed to a high degree of carbonation in a fixed period of time.

Liquid water in the pores speeds up the reaction rate because it provides a medium for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is present in the precursor material (e.g., as residual water from prior mixing step) and liquid water is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a second exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a third exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is performed at about 25 to 90° C. and 0 psig (at ambient atmospheric pressure) for about 2 to 72 hours.

In the above embodiments, the time required for curing of a composite material object is determined by the ability of water vapor and $CO_2$ gas to diffuse throughout the object. In general, thicker objects take longer to cure than thinner objects. Similarly, objects with high density (and fewer open pore spaces) take longer to cure than objects with low density (and more open pore spaces). Table 1 provides examples of how the curing times may vary with respect to the smallest thickness (or wall thickness or section thickness) of the three dimensions and the bulk density of an object that is being manufactured.

TABLE 1

| Composite Material Smallest Thickness (mm) | Composite Material Bulk Density (gm/cm$^3$) | Approximate Curing Time (h) |
|---|---|---|
| 25 | 1.6-2.3 | 8-12 |
| 75 | 2.1-2.3 | 16 |
| 100 | 0.4-0.8 | 8-12 |
| 200 | 1.5 | 72 |
| 200 | 2.4 | 72 |

Discussion of Manufactured Microstructures

Figure 11A:
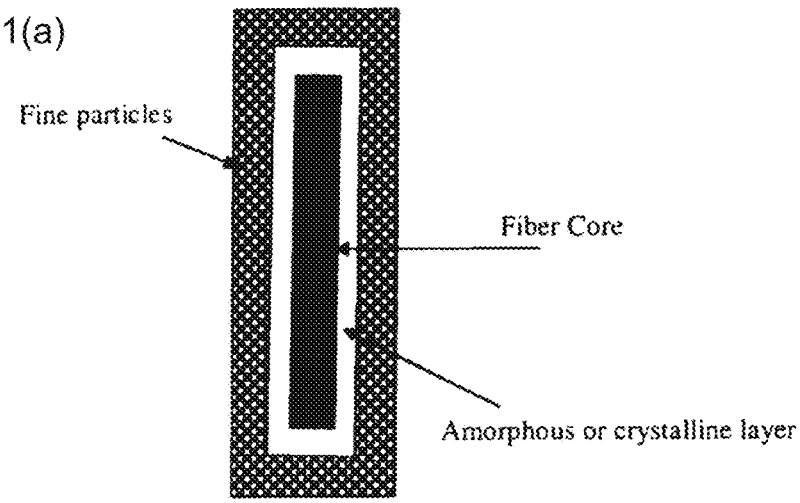
FIGS. 11(a)-11(c) are schematic illustrations of cross-sections of bonding elements according to exemplary embodiments of the present invention, including three exemplary core morphologies: (a) fibrous, (b) elliptical, and (c) equiaxed.
Figure 11B:
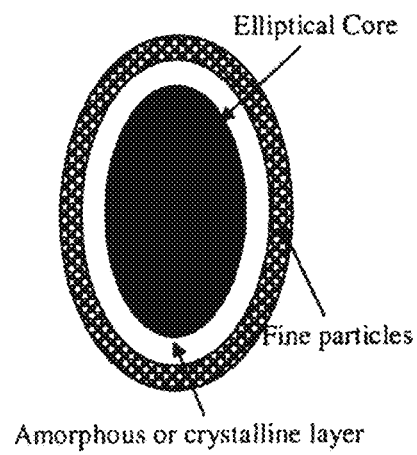
Figure 11C:
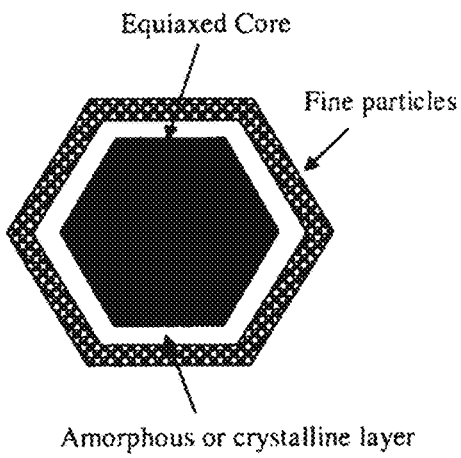

As schematically illustrated in FIGS. 11(a)-11(c), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Figures 12C, 12D:
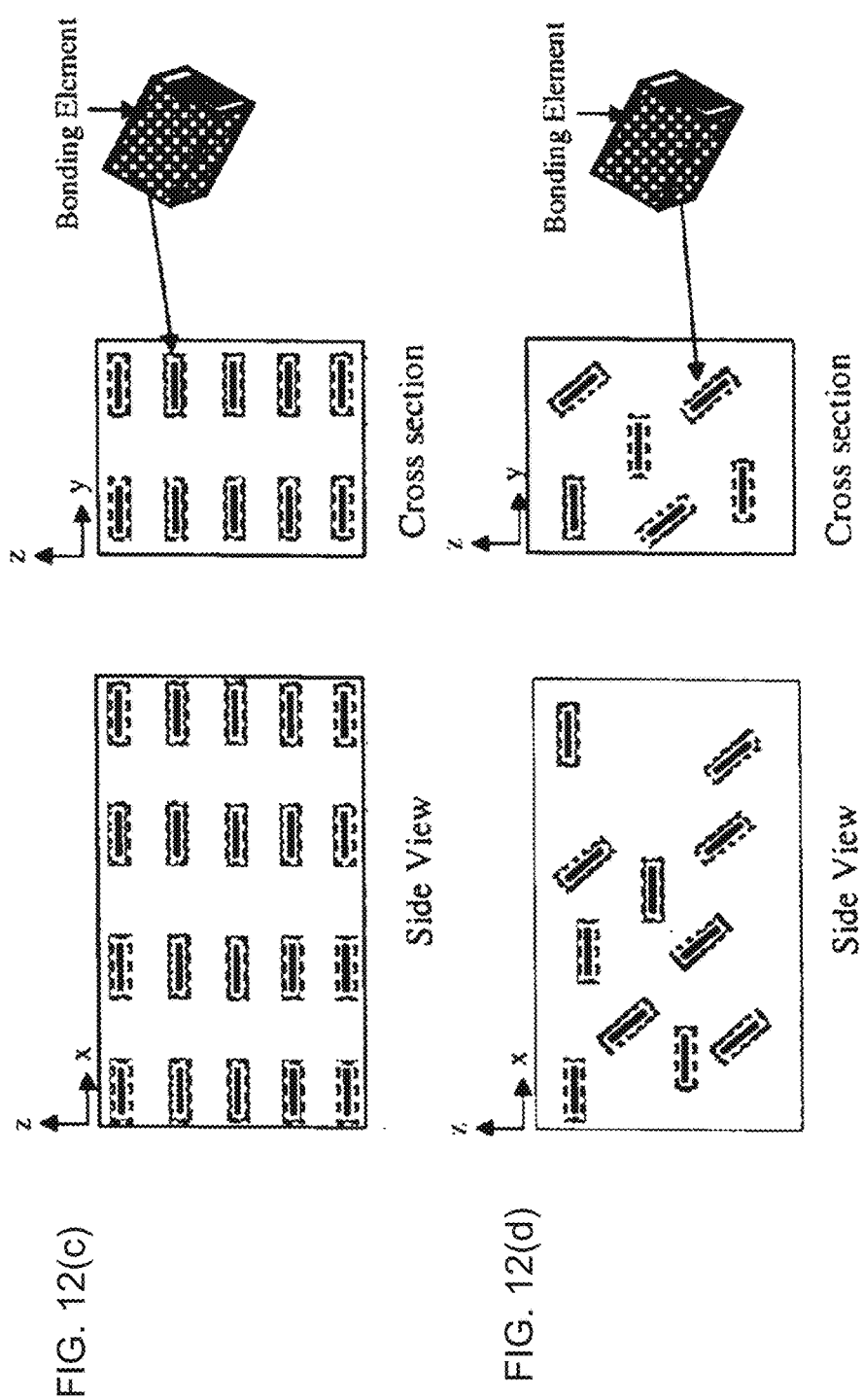

Within the bonding matrix, the bonding elements may be positioned, relative to each other, in any one of a number of orientations. FIGS. 12(a)-12(f) schematically illustrate an exemplary bonding matrix that includes fiber- or platelet-shaped bonding elements in different orientations possibly diluted by the incorporation of filler material, as represented by the spacing between the bonding elements. FIG. 12(a), for example, illustrates a bonding matrix that includes fiber-shaped bonding elements aligned in a one-direction ("1-D") orientation (e.g., aligned with respect to the x direction). FIG. 12(b) illustrates a bonding matrix that includes platelet-shaped bonding elements aligned in a two-direction ("2-D") orientation (e.g., aligned with respect to the x and y directions). FIG. 12(c) illustrates a bonding matrix that includes platelet-shaped bonding elements aligned in a three-direction ("3-D") orientation (e.g., aligned with respect to the x, y and z directions). FIG. 12(d) illustrates a bonding matrix that includes platelet-shaped bonding elements in a random orientation, wherein the bonding elements are not aligned with respect to any particular direction. FIG. 12(e) illustrates a bonding matrix that includes a relatively high concentration of platelet-shaped bonding elements that are aligned in a 3-D orientation. FIG. 12(f) illustrates a bonding matrix that includes a relatively low concentration of platelet-shaped bonding elements that are situated in a random orientation (a percolation network). The composite material of FIG. 12(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 12(e), or random orientation, e.g., FIG. 12(f), of bonding elements. Examples of connectivity patterns can be found in, for example, Newnham, et al., "Connectivity and piezoelectric-pyroelectric composites", *Mat. Res. Bull.* vol. 13, pp. 525-536, 1978).

The plurality of bonding elements may be chemically transformed from any suitable precursor materials, for example, from a precursor calcium silicate other than Wollastonite. The precursor calcium silicate may include one or more chemical elements of aluminum, magnesium and iron.

The plurality of bonding elements may have any suitable median particle size and size distribution dependent on the desired composite material. In certain embodiments, the plurality of bonding elements have a median particle size in the range of about 5 μm to about 100 μm (e.g., about 5 μm to about 80 μm, about 5 μm to about 60 μm, about 5 μm to about 50 μm, about 5 μm to about 40 μm, about 5 μm to about 30 μm, about 5 μm to about 20 μm, about 5 μm to about 10 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm). In a preferred embodiment, the bonding elements have a median particle size in the range of 5 μm to 25 μm.

In some instances a composite material includes: a plurality of bonding elements and a plurality of filler particles. Each bonding element includes: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together, whereby the composite material exhibits one or more textures, patterns and physical properties. In some instances, the bonding elements may have a core of magnesium silicate, and a silica-rich first or inner layer, and a magnesium carbonate-rich second or outer layer. The magnesium silicate can include aluminum, calcium, iron or manganese oxides.

The plurality of filler particles may have any suitable median particle size and size distribution. In certain embodiments, the plurality of filler particles has a median particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 µm, about 20 µm to about 5 mm, about 20 µm to about 4 mm, about 20 µm to about 3 mm, about 20 µm to about 2 mm, about 20 µm to about 1 mm, about 20 µm to about 500 µm, about 20 µm to about 300 µm, about 100 µm to about 5 mm, about 100 µm to about 4 mm, about 100 µm to about 3 mm, about 100 µm to about 2 mm, about 100 µm to about 1 mm).

In certain preferred embodiments, the filler particles are made from a calcium carbonate-rich material such as limestone (e.g., ground limestone). In certain materials, the filler particles are made from one or more of SiO2-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, calcium carbonate-rich material and magnesium carbonate-rich material.

In certain preferred embodiments, preparing a green specimen of a composite material comprises the further step of mixing a granular silicate material and a second granular solid material with continuous or discontinuous fibers The weight ratio of (bonding elements):(filler particles) may be any suitable rations dependent on the desired composite material, for example, in the range of about (10 to 50):about (50 to 90).

In certain embodiments, these composite materials may display various patterns, textures and other characteristics, such as visual patterns of various colors. In addition, the composite materials of the invention exhibit compressive strength, flexural strength and water absorption properties similar to conventional concrete or the corresponding natural materials.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

Curing Thin Composite Material Sections

We now describe methods of curing thin composite material sections rapidly in humid and carbon dioxide rich conditions.

Among the advantages of the systems and methods for curing thin composite material sections made according to the principles of the invention as described herein are: reduced primary efflorescence, a reduced tendency of cracking due to chemical shrinkage, improved aesthetic value because the process is performed using cement that is lighter in color, reduced mold turn-around times and consumption of $CO_2$ which is a greenhouse gas.

Geometries and Sizes

Some of the examples of section geometries and sizes are listed in Table 2 presented below.

TABLE 2

| Length (mm) | Width (mm) | Thickness (mm) |
|---|---|---|
| 55 | 55 | 10 to 15 |
| 110 | 55 | 10 to 15 |
| 110 | 110 | 10 to 15 |
| 110 | 220 | 10 to 15 |
| 220 | 220 | 10 to 15 |

Cross Section Geometries of Thin Composite Material Sections

We have demonstrated the curing of 11-14 mm thick composite material sections in six hours. The composite material sections were vibro-cast. In other embodiments, these composite material sections could also be extruded or pressed (using a green section forming process similar to what is used in the pre-cast concrete industry) with slight modification in formulation to achieve the right rheology of the slurry used before curing.

FIG. 13A is a schematic cross section of a first shape of a thin composite material section having edges designated as 1311, 1312, 1313, and 1314.

FIG. 13B is a schematic cross section of a second shape of a thin composite material section having edges designated as 1321, 1322, 1323, 1324, 1325, 1326, 1327, and 1328.

FIG. 13C is a schematic cross section of a third shape of a thin composite material section having edges designated as 1331, 1332, 1333, and 1334.

FIG. 13D is a schematic cross section of a fourth shape of a thin composite material section having faces designated as 1341, 1342, 1343, and 1344.

The shapes shown in FIGS. 13A and 13B can be made by pressing the green section prior to curing. The shape shown in FIG. 13D can be made by using a mold having as its bottom surface the curved shape shown as the top of the section illustrated in FIG. 13D.

While the geometries that have been described are square or rectangular, it is possible also to make objects having any convenient shape, such as circles, triangles, hexagons, and so forth.

Raw Materials

The raw materials used included synthetic Wollastonite (SC-C2), from Donghai Golden Resources Industries, Donghai, China; construction sand from Bound Brook, N.J., water and Glenium® 7500 high-range water-reducing admixture (available from BASF Corporation, 23700 Chagrin Boulevard, Cleveland, Ohio 44122-5544). Table 3 gives the total percentages of the solid and liquid components and the relative percentages of the component raw material used in each of the solid and liquid mixtures of the raw materials used to prepare the pavers.

TABLE 3

Mixing Proportions (100 kg batch)

|  | Mass % |  |
|---|---|---|
| Solid Components (total): | 92% | 92 kg |
| Synthetic Wollastonite (SC-C2) | 22% | 20.24 kg |
| Construction sand | 78% | 71.76 kg |
| Liquid Components (total): | 8% | 8 kg |
| Tap Water | 98.81% | 7.90 kg |
| Glenium ® 7500 | 1.19% | 0.10 kg |

Mixing Procedure

The procedure for mixing the components that was used in making the sections included the following steps, which was performed using a motor driven mechanical mixer 1. Measure and load construction sand into a planetary mixer (Sicoma Model MP375/250 planetary mixer, available from Sicoma North America Inc., 1014 Ohio Avenue, Palm Harbor, Fla. 34683).
2. Measure and load synthetic Wollastonite (SC-C2) into the mixer.

Although steps 1 and 2 are stated in a given order, it is equally effective to preform them in the order of step 2 prior to step 1. In alternative embodiments, premeasured amounts of the sand and synthetic Wollastonite can be loaded into the mixer simultaneously, and then mixed.

3. Mix the solid components loaded into the mixer for approximately 3 minutes. This creates a dry mixture.
4. Measure and load the liquid component into the mixer containing the dry mixture, and continue mixing for approximately for 2 minutes until a uniform slurry is formed. This creates a wet mixture.

The times given were adequate for the amount of the slurry that was produced. If one wanted to make a larger amount of slurry, it might require longer mixing times to get a uniform mixture, depending on the size and speed of the mixer used.

Forming Procedure

Sufficient wet mixture is then poured into a 110 mm×110 mm mold to form a specimen having a thickness in the range of 11 to 14 mm.

The mold is placed on a vibrating table and the wet mixture is allowed to compact under vibration to form the green ceramic or composite material body in the form of a thin composite material section.

Curing Procedure

Figure 14:
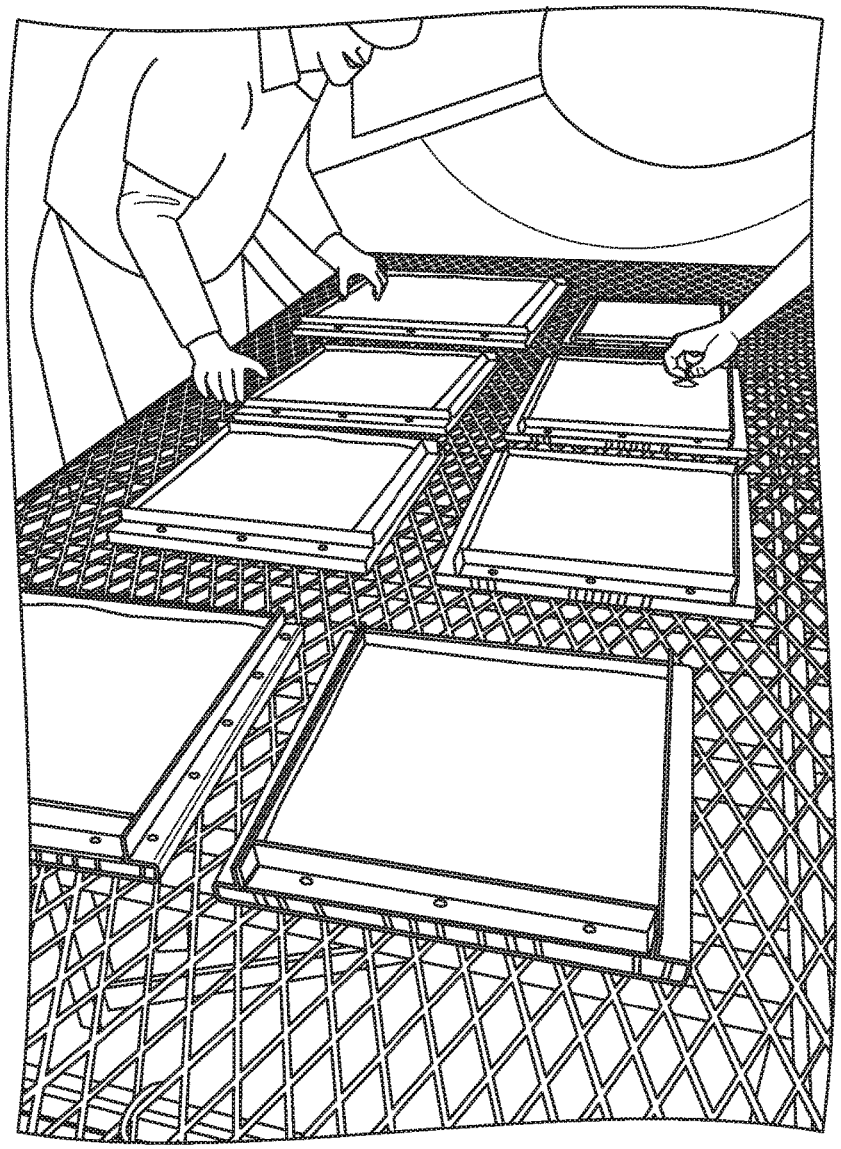
FIG. 14 is an image of several thin composite material sections in metal molds being placed in a curing chamber.

FIG. 14 is an image of several thin composite material sections in metal molds placed in a curing chamber. The thin composite material sections have only one side of each section exposed to the ambient in the curing chamber. The thin composite material section nearest the viewer as shown in FIG. 14 has length and width dimensions of 220 mm×220 mm. At least some of the other thin composite material sections that are shown have different length and width dimensions.

The green ceramic or composite material bodies in the molds were placed inside the 7 foot diameter, 12 foot long, horizontal, curing chamber shown in FIG. 14. The curing chamber was purged with $CO_2$ gas for 12 minutes. The temperature of the curing chamber was then set to 60° C.

The green ceramic or composite material bodies were cured under these conditions for 6 hours. It is believed that a curing period of 6 hours or less is sufficient to cure such composite materials if they have a sufficiently thin cross section, such as the 10 to 15 mm described herein. It is believed that green composite material bodies may be cured in times shorter than 6 hours, such as curing in less than 4 house, less than 2 hours, or less than 1 hour. The cured ceramic or composite material bodies were removed from the curing chamber and placed in an industrial dying oven at 90° C. to remove any residual water. The extent of the reaction of the cement with $CO_2$ was calculated based on the weight gain of the specimen during the reaction. The cured ceramic or composite material bodies exhibited an extent of reaction of at least 50%.

Testing and Performance

Flexural strength of these thin slabs were tested by loading the slab at the center point and supporting the slab at its two ends. Flexural strengths up to 750 psi was attained after 6 hours of curing for sections less than 14 mm thickness. The slabs exhibited no visible efflorescence after exposure to open air for a period of one week.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method of rapidly curing a thin composite material section, comprising the steps of:
    forming a particulate composition comprising ground calcium silicate having a median particle size of about 1 μm to about 100 μm, and at least one of ground calcium carbonate or $SiO_2$ containing material having a median particle size of about 3 μm to about 25 mm;
    forming a liquid composition comprising water and a water-soluble dispersant;
    mixing the particulate composition and the liquid composition to form a slurry;
    forming the slurry into a green body having a desired shape with a cross section in the range of 5 mm to 25 mm;
    reacting the green body with $CO_2$ in a curing chamber under a pressure of about ambient atmospheric pressure to about 50 psi above ambient atmospheric pressure to produce a cured composite material.

2. The method of rapidly curing a thin composite material section of claim 1, wherein said cross section is in the range of 11 mm to 14 mm.

3. The method of rapidly curing a thin composite material section of claim 1, wherein said ground calcium silicate material is synthetic wollastonite.

4. The method of rapidly curing a thin composite material section of claim 1, wherein the at least one of ground calcium carbonate or $SiO_2$ containing material is at least one of sand and flyash.

5. The method of rapidly curing a thin composite material section of claim 1, wherein the step of forming the particulate composition further comprises mixing the ground calcium silicate material and the at least one of ground calcium carbonate or $SiO_2$ containing material with continuous or discontinuous fibers.

6. The method of rapidly curing a thin composite material section of claim 1, further comprising the step of heating the cured composite material to drive off water.

7. The method of rapidly curing a thin composite material section of claim 1, wherein said step of reacting the green body with $CO_2$ in a curing chamber is performed for 6 hours or less.

8. The method of rapidly curing a thin composite material section of claim 1, wherein said step of reacting the green body with $CO_2$ in a curing chamber is performed at a temperature of 60° C.

9. The method of rapidly curing a thin composite material section of claim 1, wherein the step of forming the slurry into the green body having desired shape comprising placing the slurry in a mold prior to the reacting step.

10. The method of rapidly curing a thin composite material section of claim 9, wherein the step of placing the slurry in a mold further comprises applying vibration.

11. The method of rapidly curing a thin composite material section of claim 9, wherein the step of placing the slurry in a mold further comprises pressing.

12. The method of rapidly curing a thin composite material section of claim 1, wherein the step of forming the slurry into the green body having desired shape comprises extrusion.

13. The method of rapidly curing a thin composite material section of claim 1, wherein said thin composite material has a length in the range of 55 to 220 mm.

14. The method of rapidly curing a thin composite material section of claim 1, wherein said thin composite material has a width in the range of 55 to 220 mm.

15. The method of rapidly curing a thin composite material section of claim 1, wherein said thin composite material comprises bonding elements having a mean particle size in the range of 5 to 50 micrometers.

16. The method of rapidly curing a thin composite material section of claim 1, wherein said thin composite material comprises bonding elements having a mean particle size in the range of 5 to 25 micrometers.

* * * * *